United States Patent [19]

Deckers et al.

[11] Patent Number: 5,453,472
[45] Date of Patent: Sep. 26, 1995

[54] REDUCTION OF THE WALL COATING IN THE SUSPENSION POLYMERIZATION OF MONOMERS CONTAINING ACRYLATE AND/OR METHACRYLATE GROUPS

[75] Inventors: Andreas Deckers, Flomborn; Wolfgang Schatz, Ludwigshafen; Karl-Ludwig Endlich; Guenter Zimmer, both of Mainz, all of Germany

[73] Assignee: BASF Aktiengesellschaft, Ludwigshafen, Germany

[21] Appl. No.: 255,948

[22] Filed: Jun. 7, 1994

[30] Foreign Application Priority Data

Jun. 22, 1993 [DE] Germany .................. 43 20 660.3

[51] Int. Cl.⁶ .................................................. C08F 2/18
[52] U.S. Cl. ...................... 526/74; 526/173; 526/202
[58] Field of Search ........................ 526/74, 202, 173

[56] References Cited

U.S. PATENT DOCUMENTS 3,970,610  7/1976  Ruchlak et al. ................ 526/74

FOREIGN PATENT DOCUMENTS 372968  6/1990  European Pat. Off. .

Primary Examiner—Joseph L. Schofer
Assistant Examiner—Tom Weber
Attorney, Agent, or Firm—Keil & Weinkauf

[57] ABSTRACT

Reduction of the wall coating in reaction containers in the suspension polymerization of monomers containing acrylate and/or methacrylate groups and use of a buffer and of a dispersant for reducing the wall coating in reaction containers in the suspension polymerization of monomers containing acrylate and/or methacrylate groups.

4 Claims, No Drawings

REDUCTION OF THE WALL COATING IN THE SUSPENSION POLYMERIZATION OF MONOMERS CONTAINING ACRYLATE AND/OR METHACRYLATE GROUPS

The present invention relates to an improved process for reducing the wall coating in reaction containers in suspension polymerization of monomers containing acrylate and/or methacrylate groups in a conventional manner.

The present invention furthermore relates to the use of a buffer and of a dispersant for reducing the wall coating in reaction containers in suspension polymerization of monomers containing acrylate and/or methacrylate groups.

The suspension polymerization of vinylically unsaturated monomers is a proven process for the preparation of industrially relevant plastics. As a rule, in addition to polystyrene large amounts of polymethyl methacrylate (PMMA) molding material are also produced in this way.

As in all polymerizations, a polymer coating generally forms on the reactor walls in the course of the reaction, said coating on the one hand having an adverse effect on the heat transfer into the thermostating medium (heating, cooling) on the other hand also influencing the product properties. It is therefore necessary either to suppress the formation of the coating or to remove the coating frequently.

In the case of polymer materials which adhere strongly to the wall, such as PMMA, enameled polymerization kettles which, owing to their smooth surface, have only a small amount of coating are frequently used. However, the enamel is very sensitive to impact and scratching, so that, in the course of time, bare areas form in the kettle, which in turn results in the formation of polymer coating. It would therefore be advantageous to use kettles made of stainless steel.

In practice, the polymer coatings in stainless steel kettles are removed, for example, by cleaning with high-pressure water. However, this is technically very complicated and hence expensive.

The use of additives during the suspension polymerization, for example derivatives of phenol (EP 372 968), leads to a reduction in the formation of coating but the polymers thus obtainable are discolored. Particularly for the preparation of transparent materials, such as PMMA or polystyrene, this disadvantage is not acceptable.

It is an object of the present invention to provide an improved process-for reducing the wall coating in reaction containers in the suspension polymerization of monomers containing acrylate and/or methacrylate groups.

We have found that this object is achieved by a process for reducing the wall coating in reaction containers in the suspension polymerization of monomers containing acrylate and/or methacrylate groups in a conventional manner if the polymerization is carried out in the presence of a buffer selected from the group consisting of citric acid, alkali metal citrates, alkaline earth metal citrates and ammonium citrates and a dispersant, a part of the dispersant being added only when the polymerization has progressed and the copolymer obtainable from methacrylic acid and $C_1$–$C_4$-alkyl ester of methacrylic acid being used as the dispersant.

We have furthermore found the use of a buffer and of a dispersant for reducing the wall coating in reaction containers in the suspension polymerization of monomers containing acrylate and/or methacrylate groups.

$C_1$–$C_{18}$-Alkyl esters of acrylic acid, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl acrylate, preferably methyl acrylate, n-butyl acrylate and 2-ethylhexyl acrylate, and mixtures of these monomers, and/or $C_1$–$C_{18}$-alkyl esters of methacrylic acid, such as methyl, ethyl, n-propyl, i-propyl, n-butyl, isobutyl, sec-butyl, tert-butyl, pentyl, hexyl, heptyl, octyl, 2-ethylhexyl, nonyl, decyl, lauryl or stearyl methacrylate, preferably methyl methacrylate, and mixtures of these monomers, are used as monomers containing acrylate and/or methacrylate groups.

Observations to date have shown that polymers of from 80 to 99% by weight of methyl methacrylate and from 1 to 20% by weight of methyl acrylate have proven particularly advantageous.

According to the invention, citric acid and its water-soluble salts, preferably alkali metal and alkaline earth metal citrates, and ammonium citrates are used as buffers. Examples are lithium dihydrogen citrate, sodium dihydrogen citrate, potassium dihydrogen citrate, dilithium hydrogen citrate, disodium hydrogen citrate, dipotassium hydrogen citrate, diammonium hydrogen citrate, magnesium hydrogen citrate, calcium hydrogen citrate, trilithium citrate, trisodium citrate, tripotassium citrate, triammonium citrate, trimagnesium dicitrate and tricalcium dicitrate.

A mixture of citric acid and one of the abovementioned salts is preferably used, a mixture of citric acid and a trialkali metal citrate, particularly preferably trisodium citrate, being preferred.

The amount of buffer is in general from 0.001 to 2, preferably from 0.001 to 1, particularly preferably from 0.002 to 0.1, % by weight. In the case of a mixture of citric acid and one of its salts, the molar ratio of citrate to citric acid is chosen in general in the range from 100:1 to 1:1, depending on the desired pH.

According to the invention, the polymerization is carried out in the presence of up to 5, preferably from 0,001 to 1, particularly preferably from 0.01 to 0.5%, by weight, based on the water present in the reaction mixture, of dispersants.

According to the invention, a copolymer obtainable from methacrylic acid and a $C_1$–$C_4$-alkyl ester of methacrylic acid, such as methyl, ethyl, n-propyl, isopropyl, n-butyl, isobutyl, sec-butyl or tert-butyl methacrylate, preferably methyl methacrylate, is used as the dispersant.

Observations to date have shown that dispersants based on polyvinyl alcohol or polyacrylic acid do not lead to any reduction of the wall coating.

These copolymers can be used as (poly)acid or as alkali metal or ammonium salts, the alkali metal salts being preferred. Observations to date have shown that polymers of from 60 to 70% by weight of methacrylic acid and from 30 to 40% by weight of methyl methacrylate, whose free carboxyl groups have been neutralized with sodium hydroxide solution, are particularly suitable.

According to the invention, a part of the dispersant is added only when the polymerization has progressed. In a preferable procedure, from 5 to 30, preferably from 10 to 20, % by weight of the dispersant are added to the reaction mixture only when monomer conversions of from 20 to 80%, preferably from 30 to 70%, have been reached. Here, the monomer conversion is the amount of the most rapidly reacting monomer (as a rule methyl methacrylate) which is converted into polymer.

Otherwise, the polymerization is usually carried out in a conventional manner by the suspension polymerization method. For this purpose, the aqueous phase and monomer phase are generally initially taken, with the addition of dispersant and buffer.

In order to improve the processing properties, heat stabilizers, for example sterically hindered phenols, and lubricants, eg. stearic acid, may be added.

The monomer phase usually contains molecular weight regulators and at least one initiator.

By repeatedly forcing in an inert gas, such as nitrogen, and then letting down the pressure each time, the reaction batch is, as a rule, rendered inert. After once again forcing in inert gas, the monomer phase is dispersed, in general initially at room temperature, by stirring in the aqueous phase, the mixture is then heated to the polymerization temperature, which is usually from 80° to 150° C. The pressure in the kettle is usually from 0.1 to 1 MPa. After a reaction time of 10 hours, the polymerization is generally complete.

The molecular weight can be regulated by suitable chain transfer agents, for example mercaptans, or by suitable temperature control. In general, molecular weights of from 50,000 to 300,000, preferably from 80,000 to 200,000, g/mol (weight average molecular weight) are chosen.

In general, conventional free radical initiators, such as peroxides and azo compounds, are used as polymerization initiators, which are generally added to the monomer phase, preferably chosen initiators being those whose decomposition temperatures, ie. temperatures at which half the initiator has decomposed after one hour, are below 150° C. In certain circumstances, it may be advantageous also to use a mixture of different initiators. The amount used is as a rule from 0.1 to 5% by weight, based on the total amount of monomers.

Examples of suitable peroxide initiators are peroxydicarbonates, peroxyesters, diacyl peroxides, monoperoxycarbonates, perketals and dialkyl peroxides. Observations to date have shown that dilauryl peroxide, tert-butyl per-2-ethylhexanoate, tert-butyl per-3,5,5-trimethylhexanoate, 2,2-bis(tert-butylperoxy)butane, 1,1-bis (tert-butylperoxy)cyclohexane and dibenzoyl peroxide are particularly suitable.

Azobisisobutyronitrile or azobis(2,4-dimethyl)valeronitrile may be used as azo compounds.

The total amount of initiators is preferably from 0.02 to 0.5% by weight, based on the polymer.

The suspension polymers may contain additional additives and processing assistants. The amount thereof is as a rule up to 5, preferably up to 2, % by weight, based on the total weight of the suspension polymers.

Conventional additives are, for example, stabilizers and antioxidants, heat stabilizers, lubricants and mold release agents, dyes, pigments, plasticizers, antistatic agents and flameproofing agents.

Antioxidants and heat stabilizers which may be added to the thermoplastic materials according to the invention are, for example, halides of metals of group I of the periodic table of elements, for example lithium halides, sodium halides and potassium halides, and copper(I) halides, eg. chlorides, bromides or iodides, or mixtures thereof. Zinc fluoride and zinc chloride may also be used. Furthermore, sterically hindered phenols, hydroquinones, substituted members of this group and mixtures of these compounds may be used, preferably in concentrations of up to 1% by weight, based on the weight of the mixture.

Lubricants and mold release agents which may be added to the thermoplastic material, as a rule in an amount of up to 1% by weight, are, for example, stearic acid, stearyl alcohol, alkyl stearates and stearamides as well as esters of pentaerythritol with long-chain fatty acids. Suitable dyes may be the conventional organic dyes, organic pigments and lakes and conventional inorganic pigments, such as titanium dioxide and cadmium sulfide. Examples of plasticizers are dioctyl phthalate, dibenzyl phthalate and butyl benzyl phthalate.

Suitable flameproofing agents include compounds which contain phosphorus-nitrogen bonds, such as phosphonitrile chloride, phosphoric ester amides, phosphoramides, phosphinamides, tris(aziridinyl)phosphine oxide or tetrakis(hydroxymethyl)phosphonium chloride.

Further methods for the suspension polymerization of acrylate and methacrylate compounds are described, for example, in Kunststoff-Handbuch, volume IX, Polymethacrylate, Carl-Hanser-Verlag, Munich, 1975, pages 15 et seq., 31 et seq.

Compared with prior art processes, the novel process has the advantage that the coating on walls of reaction containers, in particular in enameled stainless steel containers, which come into contact with the reaction mixture, can be virtually completely suppressed.

EXAMPLES

Examples 1 to 7

In an enameled stainless steel container (V2A steel) having a capacity of 15 l, a mixture of 6720 g of water, 5544 g of methyl methacrylate, 56 g of methacrylate, 13.6 g of n-dodecyl mercaptan, 2.63 g of tert-butyl perethylhexanoate, 2.3 g of tert-butyl per-3,5,5-trimethylhexanoate, 1.36 g of 2,2-bis(tert-butylperoxy)butane (as a 50% strength by weight solution in a $C_6$–$C_8$-alkane mixture (low-boiling petroleum ether)) and the corresponding amounts, stated in the table below, of dispersant and buffer are first blanketed at room temperature with nitrogen and then heated to 125° C. while stirring, and then left at this temperature for 3 hours. After the final cooling to room temperature, the polymer was then obtained by filtration and drying.

In experiments 2 and 4 to 6, a part of the dispersant was added to the reaction mixture only after a reaction time of 1.5 hours (monomer conversion of methyl methacrylate (MMA) 50% by weight).

The polymer coating (mean value from 3 experiments; deviations ±10%) on the reactor wall was determined from the difference between theoretical and actual yield.

TABLE

| No. | Dispersant [g] | Subsequent dose [%] | Buffer [g] | Coating [g] |
|---|---|---|---|---|
| according to the invention | | | | |
| 1 | 42 MAA/MMA[1] | 10 | 28 citrate[2] | 30 |
| 2 | 42 MAA/MMA[1] | 20 | 28 citrate[2] | 10 |
| for comparison | | | | |
| 3 | 42 MAA/MMA[1] | — | 28 phosphate[3] | 430 |
| 4 | 42 MAA/MMA[1] | 10 | 28 phosphate[3] | 420 |
| 5 | 42 MAA/MMA[1] | — | 28 citrate[2] | 390 |
| 6 | 102 PVOH[4] | 10 | 28 citrate[2] | 510 |
| 7 | 98 Polyacrylic acid[5] | 10 | 28 citrate[2] | 630 |

[1]Copolymer of 64% by weight of methacrylic acid and 36% by weight of methyl methacrylate in the form of a 1.6% strength by weight aqueous solution (brought to pH 7 with NaOH)
[2]Trisodium citrate
[3]Mixture of (a) $Na_2HPO_4.12H_2O$ and (b) $NaH_2PO_4.2H_2O$ ((a):(b) = 2.73:1)
[4]Partially hydrolyzed polyvinyl acetate (Mowiol® 4088 from Hoechst; viscosity of a 4% strength by weight solution in water at 20° C.: 40 mPa · s; degree of hydrolysis: 88 mol %)
[5]Polyacrylic acid (Acrysol® A3 from Rohm and Haas; 20% strength by weight in water)

We claim:

1. A process for reducing wall deposits in reaction containers during the suspension polymerization of monomers containing acrylates or methacrylate groups which consists essentially of: carrying out the polymerization in the presence of a buffer selected from the group consisting of citric acid, alkali metal citrates, alkaline earth metal citrates and ammonium citrates and in the presence of a dispersant, said dispersant being a copolymer obtained from methacrylic acid and a $C_1$–$C_4$-alkyl ester of methacrylic acid, a part of the dispersant being added only after the polymerization has begun.

2. A process as defined in claim 1, wherein the dispersant used is a copolymer obtainable from 50–90% by weight of methacrylic acid and 10–50% by weight of methyl methacrylate or an alkali metal salt thereof.

3. A process as defined in claim 1, wherein from 5 to 30% by weight of dispersant are added at a monomer conversion of from 20 to 80% of the most rapidly reacting monomer.

4. A process as defined in claim 1, wherein the reaction container used is an enameled stainless steel container.

* * * * *

UNITED STATES PATENT AND TRADEMARK OFFICE
CERTIFICATE OF CORRECTION

PATENT NO.: 5,453,472

DATED: September 26, 1995

INVENTOR(S): DECKERS et al.

It is certified that error appears in the above-identified patent and that said Letters Patent is hereby corrected as shown below:

Column 6:

Claim 2, line 2, "obtainable" should read --obtained--.

Signed and Sealed this

Twenty-eighth Day of November 1995

Attest:

BRUCE LEHMAN

*Attesting Officer*  *Commissioner of Patents and Trademarks*